(12) United States Patent
Ikeda et al.

(10) Patent No.: US 7,680,551 B2
(45) Date of Patent: Mar. 16, 2010

(54) METHOD OF ADJUSTING ORIGIN OF INDUSTRIAL ROBOT

(75) Inventors: Tatsuya Ikeda, Hyogo (JP); Hiroyuki Nakata, Osaka (JP); Seiji Iwai, Hyogo (JP)

(73) Assignee: Panasonic Corporation, Osaka (JP)

( * ) Notice: Subject to any disclaimer, the term of this patent is extended or adjusted under 35 U.S.C. 154(b) by 786 days.

(21) Appl. No.: 10/595,226

(22) PCT Filed: Oct. 24, 2005

(86) PCT No.: PCT/JP2005/019481

§ 371 (c)(1),
(2), (4) Date: Mar. 28, 2006

(87) PCT Pub. No.: WO2006/112069

PCT Pub. Date: Oct. 26, 2006

(65) Prior Publication Data

US 2008/0255701 A1      Oct. 16, 2008

(30) Foreign Application Priority Data

Apr. 14, 2005    (JP) .............................. 2005-116864

(51) Int. Cl.
*G05B 19/18* (2006.01)
*G02B 23/00* (2006.01)

(52) U.S. Cl. .............................. 700/57; 901/12; 901/13; 700/250; 700/192; 74/526; 414/744.7; 702/150; 318/568.16; 318/568.25

(58) Field of Classification Search ................. 702/150, 702/194; 901/6, 12, 13, 17; 700/192; 192/149, 192/139, 142 R
See application file for complete search history.

(56) References Cited

U.S. PATENT DOCUMENTS 4,481,592 A * 11/1984 Jacobs et al. ................ 700/254

(Continued)

FOREIGN PATENT DOCUMENTS

DE       297 17 628 U1    4/1998

(Continued)

OTHER PUBLICATIONS

Supplementary European Search Report dated Aug. 2, 2007 issued in European 0 579 5720 which is a foreign counterpart of the present application.

*Primary Examiner*—Thomas G. Black
*Assistant Examiner*—Lin B Olsen
(74) *Attorney, Agent, or Firm*—Wenderoth, Lind & Ponack, L.L.P.

(57) ABSTRACT

An industrial robot includes a first member, a positioning member arranged to be attached to the first member, a second member arranged to rotate relative to the first member, and a first joint for coupling the first member with the second member. The second member has a contact point arranged to contact the positioning member. An indication for requesting to enable the positioning member to contact the contact point is displayed. The second member rotates at the first joint relatively to the first member while the positioning member can contact the contact point. It is detected whether or not the contact point of the second member contacts the positioning member. A position of the second member is stored as an origin when it is detected that the contact point of the second member contacts the positioning member. This method prevents a possible failure of the attaching of the positioning member, and decreases a work load on an operator.

23 Claims, 5 Drawing Sheets

U.S. PATENT DOCUMENTS

| | | | |
|---|---|---|---|
| 4,632,632 A | 12/1986 | Simone | |
| 5,558,196 A * | 9/1996 | Nihei et al. | 192/142 R |
| 5,570,609 A * | 11/1996 | Nihei et al. | 74/490.05 |
| 5,771,753 A | 6/1998 | Kwon et al. | |
| 6,065,364 A | 5/2000 | Shiraki et al. | |
| 6,996,456 B2 * | 2/2006 | Cordell et al. | 700/258 |
| 2003/0216821 A1 * | 11/2003 | Kim et al. | 700/56 |

FOREIGN PATENT DOCUMENTS

| | | | |
|---|---|---|---|
| EP | 1085389 A1 * | 3/2001 | |
| EP | 1743745 A1 * | 1/2007 | |
| FR | 2 826 897 | 1/2003 | |
| JP | 61-062103 | 3/1986 | |
| JP | 63-77692 | 4/1988 | |
| JP | 2-180580 | 7/1990 | |
| JP | 7-266266 | 10/1995 | |
| JP | 2001-041709 | 2/2001 | |
| JP | 2002-239967 | 8/2002 | |
| JP | 2002239967 A * | 8/2002 | |
| JP | 2005111576 A * | 4/2005 | |

* cited by examiner

METHOD OF ADJUSTING ORIGIN OF INDUSTRIAL ROBOT

TECHNICAL FIELD

The present invention relates to a method of adjusting an origin of a joint of an industrial robot.

BACKGROUND OF THE INVENTION

In an operation of an industrial robot, an angle of a joint of a manipulator calculated by a processor, such as a CPU, for activating the joint is correlated to an actual angle of the joint. For this purpose, an origin, being a reference of a rotation of the joint is adjusted.

FIG. 6 shows a conventional apparatus for adjusting the origin disclosed in Japanese Patent Laid-Open Publication No. 2-180580. Member 611 rotates about rotation axis 620 with reference to member 612. Recess 613 is provided in the circumference of member 611 at a position corresponding to an origin. Adjusting device 630 detachable from member 612 is attached to the position corresponding to the origin. Adjusting device 630 includes switch holder 615 fixed on member 612 at the position corresponding to the origin, switch 614 held by switch holder 615, straight bearing 616 mounted on switch holder 615, and sliding rod 617 movable guided by straight bearing 616. Switch 614 includes on/off movement 614A. End 617A of sliding rod 617, a positioning member, is engaged with on/off movement 614A. When sliding rod 617 moves away from switch 614, other end 617B is put into recess 613 provided in member 611.

FIG. 7 shows another conventional apparatus of adjusting an origin disclosed in Japanese Patent Laid-Open Publication No. 2002-239967. Member 712 is coupled rotatably with member 711, so that surface 712A of member 711 contacts surface 711A of member 711. Detachable positioning member 722 is mounted detachably to mounting port 723 of member 711. Member 712 has contact point 721 for contacting positioning member 722. Positioning member 722 is a positioning pin, while mounting port 723 is a tapped hole in which the positioning pin is screwed.

In these conventional adjusting apparatuses, an operation of the positioning member for contacting members 611 and 712 is not defined. An operator practically activates an arm with a teaching device until the positioning pin contacts the members. Adjusting the origin requires accuracy, thus increasing a work load on the operator and increasing a working time. An erroneous handling by the operator during adjusting the origin may hurt the position pin and the arm. The operator attaches and detaches the positioning member. If the operator fails to attach the positioning member, the origin is not adjusted properly. If the operator fails to detach the positioning member after adjusting the origin and activates the robot, the positioning member and the arm of the robot arm may be damaged.

SUMMARY OF THE INVENTION

An industrial robot includes a first member, a positioning member arranged to be attached to the first member, a second member arranged to rotate relatively to the first member, and a first joint for coupling the first member with the second member. The second member has a contact point arranged to contact the positioning member. An indication for requesting to enabling the positioning member to contact the contact point is displayed. The second member rotates at the first joint relatively to the first member while the positioning member can contact the contact point. It is detected whether or not the contact point of the second member contacts the positioning member. A position of the second member is stored as an origin when it is detected that the contact point of the second member contacts the positioning member.

This method prevents a possible failure of the attaching of the positioning member, and decreases a work load on an operator.

REFERENCE NUMERALS

101 Manipulator
102 Controller
103 CPU
104 Communication Unit
105 ROM
105A Memory
106 RAM
107 Driver
108 Teaching Device
109 Tool
201 Arm (Second Member)
202 Arm (First Member)
203 Positioning Member
204 Contact Point
402 Display
403 Key Board
1201 Joint (Second Joint)
1202 Joint (First Joint)

DETAILED DESCRIPTION OF THE PREFERRED EMBODIMENT

Figure 1:
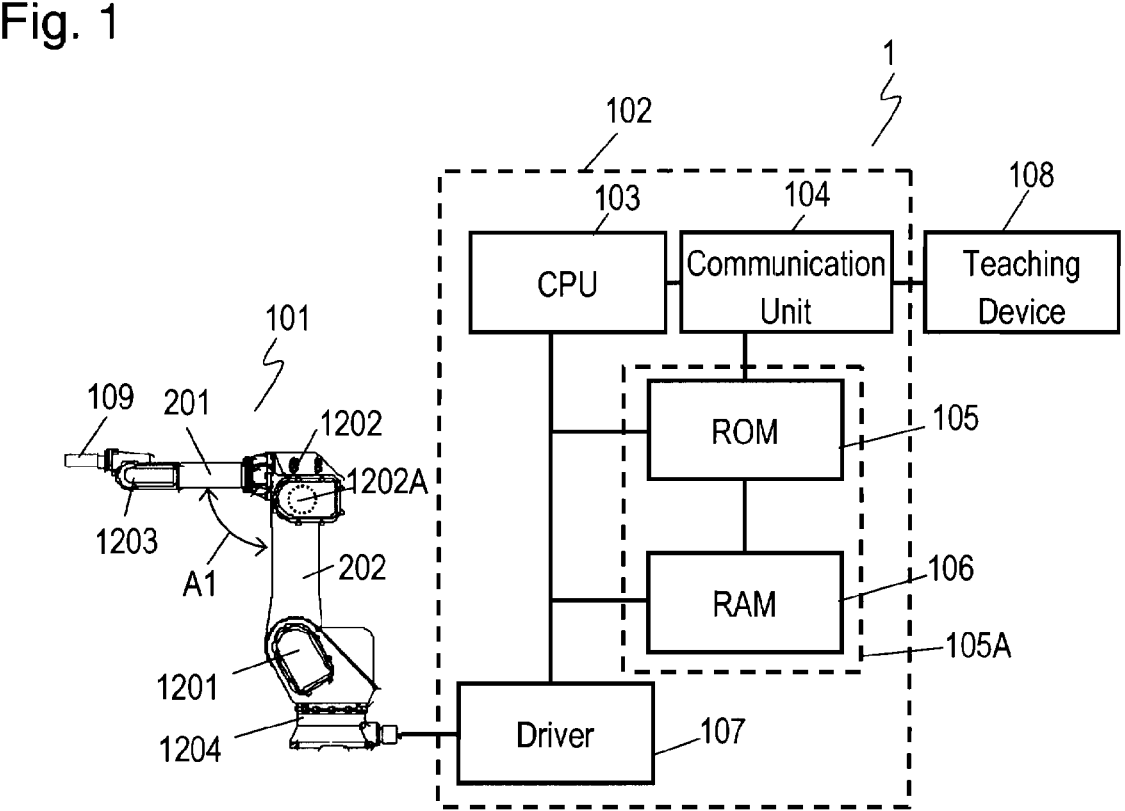
FIG. 1 is a schematic view of an industrial robot according to an exemplary embodiment of the present invention.

FIG. 1 is a schematic view of industrial robot 1 according to an exemplary embodiment of the present invention. Industrial robot 1 includes manipulator 101, tool 109 mounted on manipulator 101, controller 102 for controlling manipulator 101, and teaching device 108 used for activating manipulator 101 and controller 102. Tool 109 may be any one of several various devices, such as a welding torch and an opening/closing hand, according to the application.

Controller 102 includes CPU 103, communication unit 104 for communicating with teaching device 108, ROM 105 storing a program allowing CPU 103 to operate, RAM 106 storing variable data, such as an operation program instructed by an operator and data for establishing an operating environment, and driver 107 for driving manipulator 101. ROM 105 and RAM 106 provide memory 105A.

Manipulator 101 includes arms 202 and 201 rotating with respect to each other, base 1204, joint 1202 coupling arm 201 with arm 202, joint 1201 coupling arm 202 with base 1204, and joint 1203 coupling tool 109 and arm 201. Driver 107 of controller 102 controls the respective motors of joints 1201 to 1203 to drive manipulator 101.

An operation of industrial robot 1 will be described below. An operator inputs an instruction for activating manipulator 101 to teaching device 108. The instruction input to teaching device 108 is sent to controller 102, and is sent to CPU 103 via communication unit 104. CPU 103 controls driver 107 according to the instruction for activating manipulator 101. The operator moves arms 202 and 201 of manipulator 101 to a predetermined position and stance, and has the position and stance stored in RAM 106 through a registering operation through teaching device 108. The above processes provide an operation program.

RAM 106 can store plural operation programs. In order to have industrial robot 1 execute a predetermined task, such as welding and handling, the operator uses teaching device 108 to select a operation program executing the predetermined task from the operation programs stored in the memory. CPU 103 reads and interprets the selected operation program and controls manipulator 101 through driver 107 to have industrial robot 1 execute the task.

CPU 103 calculates angles of respective joint axes of joints 1201 to 1203 of manipulator 101. Before industrial robot 1 operates according to the operation program, the calculated angles are correlated to actual angles. That is, an origin, being a reference of the angle of each joint axis, is adjusted. A method of adjusting the origin of industrial robot 1 will be described below.

Figure 2A:
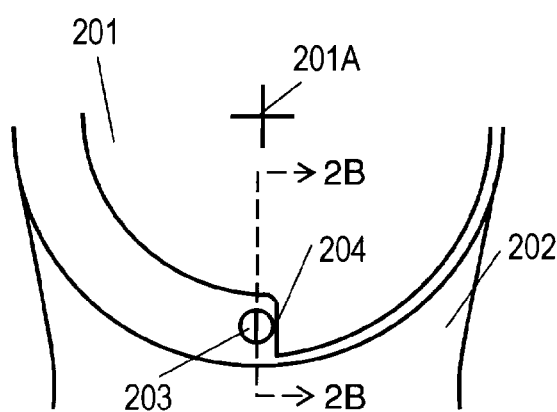
FIG. 2A is a front view of a joint of the industrial robot according to the embodiment.
Figure 2B:
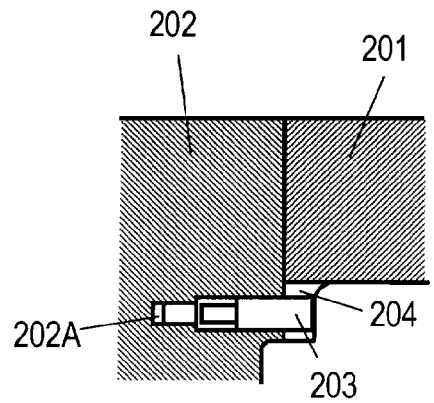
FIG. 2B is a cross sectional view of the joint shown in FIG. 2A at line 2B-2B.

FIG. 2A is a front view of joint 1202. FIG. 2B is a cross sectional view of joint 1202 at line 2B-2B. Arm 201 rotates about joint axis 201A relatively to arm 202. Positioning member 203 to be attached to arm 202 is a reference for adjusting the origin. As arm 201 rotates relatively to arm 202, contact point 204 contacts positioning member 203, thus setting an angle between arm 201 and arm 202 to a predetermined angle. Arm 201 is thus positioned with respect to arm 202, and the predetermined angle becomes the origin, the reference. Arm 202 has hole 202A therein for accommodating positioning member 203. While being accommodated in hole 202A, positioning member 203 does not protrude from a surface, thereby not contacting arm 201 regardless of the position of arm 201.

Figure 3:
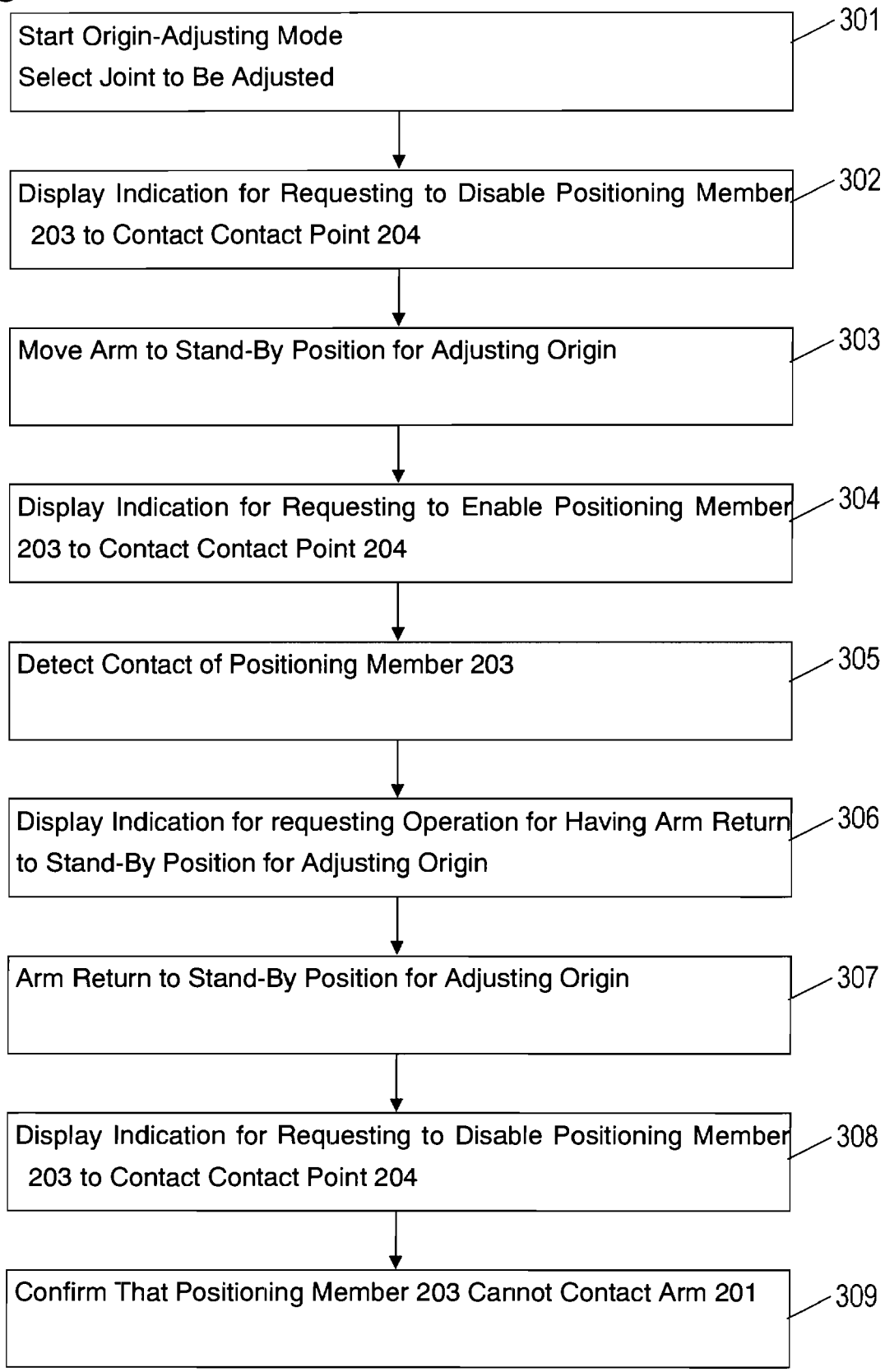
FIG. 3 is a flow chart showing a method of adjusting an origin according to the embodiment.
Figure 4A:
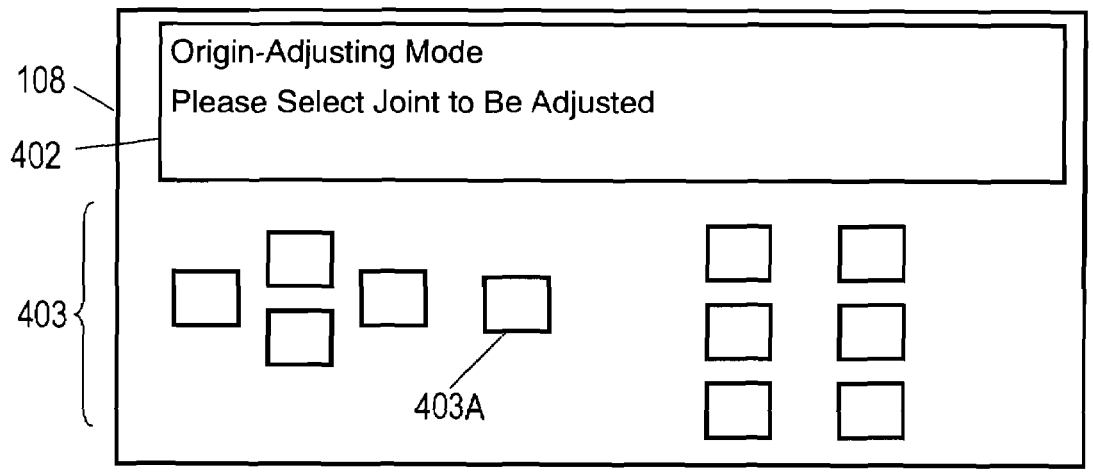
FIG. 4A shows a teaching device according to the embodiment.

FIG. 3 is a flow chart illustrating a method of adjusting the origin of industrial robot 1. FIG. 4A shows teaching device 108. Teaching device 108 includes display 402 and keyboard 403 for allowing the operator to input the instruction and data. Display 402 displays messages read out by CPU 103 from ROM 105. FIGS. 4B to 4E show the messages displayed on display 402.

The operator presses keyboard 403 of teaching device 108 to start an origin-adjusting mode, and then, display 402 displays a message shown in FIG. 4A for indicating that the apparatus shifts to the origin-adjusting mode and for requesting the operator to select a joint axis to be adjusted from the axes (Step 301). The operator selects an axis where its origin is to be adjusted from axes of joints 1201 to 1203. Here, the axis of joint 1202 is selected.

Figure 4B:
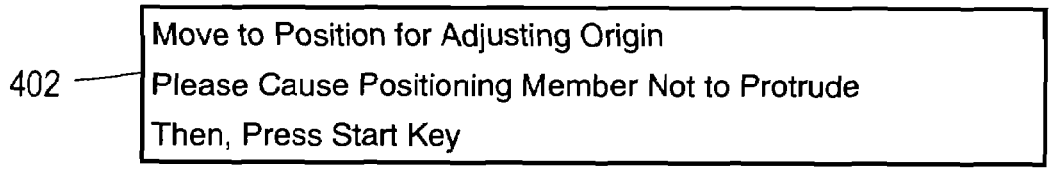
FIG. 4B shows a message displayed on the teaching device.
Figure 7:
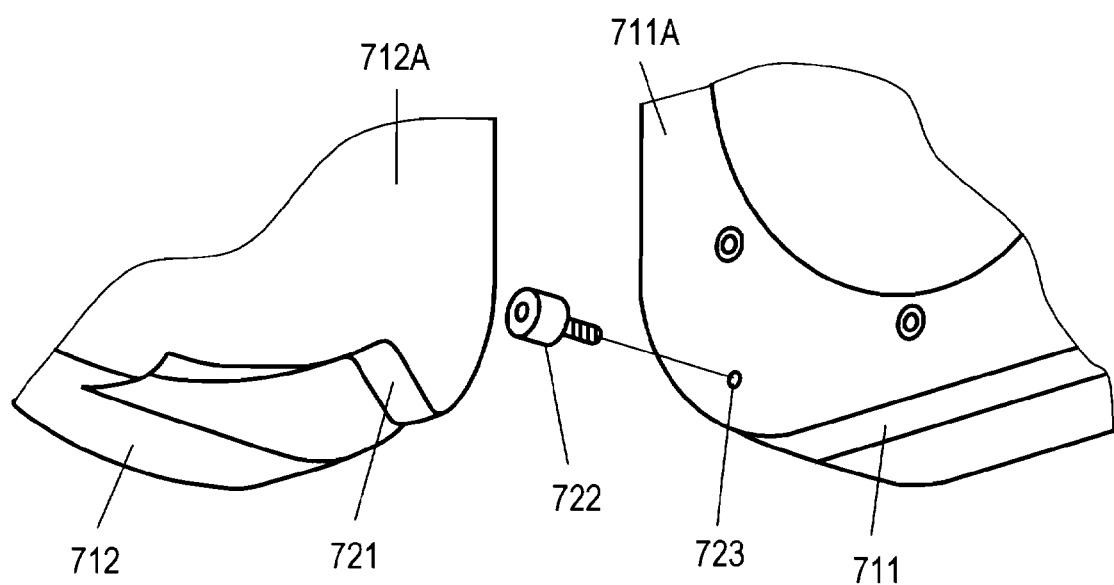
FIG. 7 shows a conventional apparatus for adjusting an origin.

After the operator selects the axis to be adjusted, display 402 displays an indication shown in FIG. 4B for requesting the operator to prevent positioning member 203 from contacting contact point 204 (Step 302). That is, in order to start adjusting the origin, display 402 indicates that arm 201 is to be moved to a stand-by position. Then, display 402 displays a message for having the operator cause positioning member 203 not to protrude, so that positioning member 203 is not damaged by collision with contact point 204 or arm 201. The operator checks the status of positioning member 203. If positioning member 203 protrudes from arm 202, the operator put positioning member 203 into hole 202A. In the case that the robot includes positioning member 722 shown in FIG. 7, positioning member 722 is detached from mounting port 723.

Then, the operator inputs an instruction through keyboard 403 for moving arm 201 to a stand-by position for adjusting the origin, by pressing start key 403A of keyboard 403. A signal from keyboard 403 is sent from teaching device 108 to communication unit 104 of controller 102. CPU 103 activates driver 107 in accordance with the program stored in ROM 105, and activates only joint 1202 selected at Step 301 (Step 303).

Figure 5:
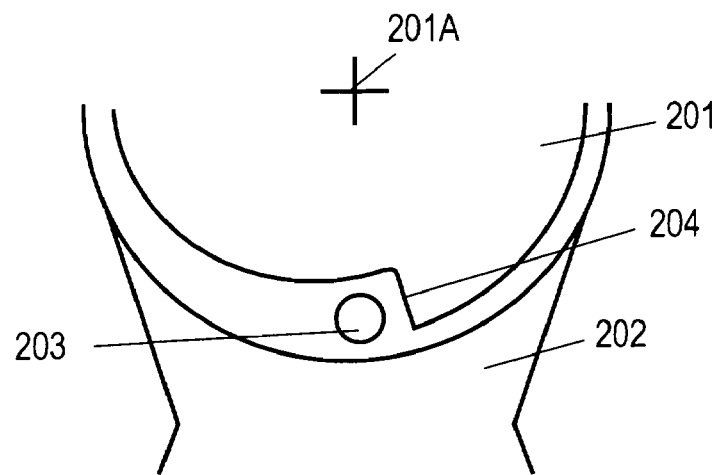
FIG. 5 is a front view of the joint of the industrial robot according to the embodiment.
Figure 6:
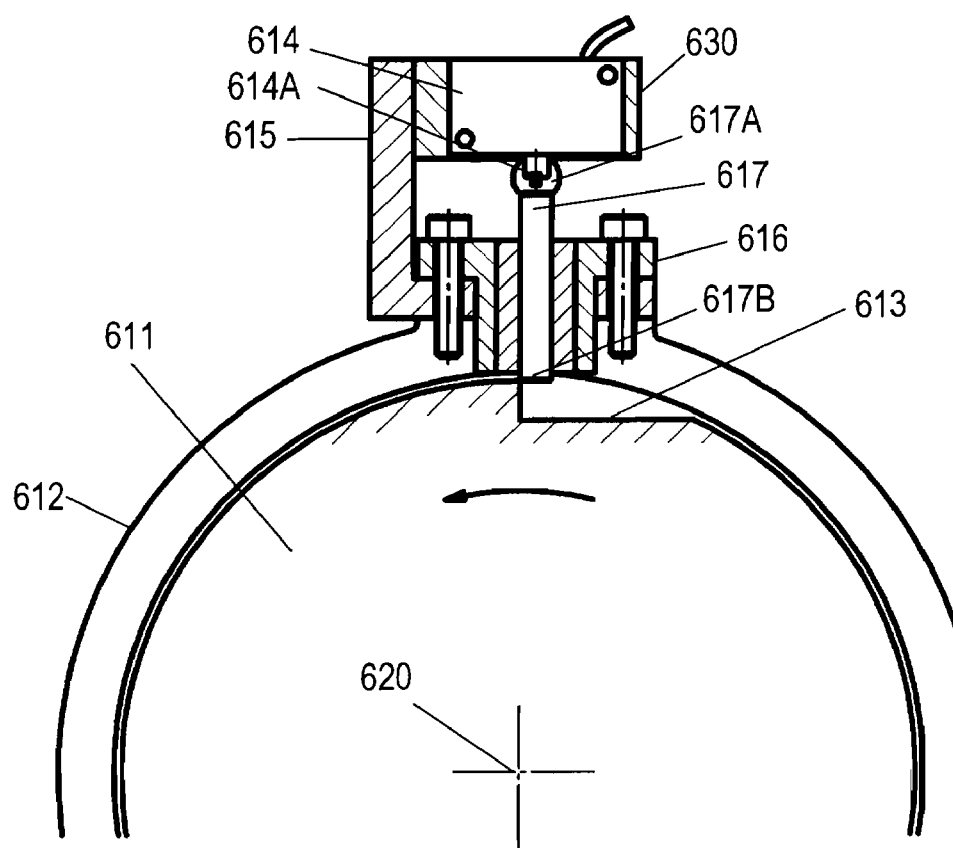
FIG. 6 shows a conventional apparatus for adjusting an origin.

FIG. 5 is a front view of joint 1202 at Step 303. According to the rotation at the axis of joint 1202, arm 201 rotates relatively to arm 202. At Step 303, arm 201 moves to the stand-by position. The stand-by position is defined as a position at which contact point 204 of arm 201 does not contact positioning member 203 but just before contacting positioning member 203.

The stand-by position can be determined by angle A1 (see FIG. 1) between arm 201 and arm 202. In the case that angle of 0° calculated by CPU 103 corresponds to angle A1 of 90°, the stand-by position can be, e.g. angle A1 of 100°, i.e., angle 10° calculated by CPU 103. Thus, the stand-by position can be referred to as a position at which positioning member does not contact arm 201. The stand-by position, angle of 10°, i.e., angle A1 of 100°, is stored in ROM 105. Angle A1 used for determining the stand-by position is not necessarily precise. For example, the operator may position, with teaching device 108, one of arms 201 and 202 in a horizontal position while positioning the other of the arms in a vertical position, and then stores the positions of arms 201 and 202 in RAM 106 as a provisional position corresponding to angle of 0°. The position corresponding to the angle of 0° may be roughly determined, and then the position may be used as the basis for setting roughly the stand-by position corresponding to the angle of 10°. The angle of 0° calculated by CPU 103 does not necessarily correspond to angle A1 of 90°, but may correspond to other angle, such as 0°.

Instead, the stand-by position may be determined by the operator with teaching device 108. The operator positions contact point 204 of arm 201 near positioning member 203 with teaching device 108, so that contact point 204 may not contact positioning member 203. The operator then stores angle A1 (e.g. approximately 100°) between arms 201 and 202 in RAM 106 as the stand-by position. The stand-by position may not necessarily be precise as far as positioning member 203 does not contact arm 201. Therefore, the operator can determine the stand-by position easily.

When arm 201 reaches the stand-by position, display 402 displays an indication for requesting to enable positioning member 203 to contact contact point 204 (Step 304). That is, display 402 displays a message shown in FIG. 4C for requesting the operator to execute an operation for having contact point 204 contact positioning member 203. Acknowledging the message, the operator takes out positioning member 203 from hole 202A in arm 202 such that positioning member 203 protrude from arm 202. If the robot includes positioning member 722 shown in FIG. 7, the operator put positioning member 722 into the taped hole.

Figure 4C:
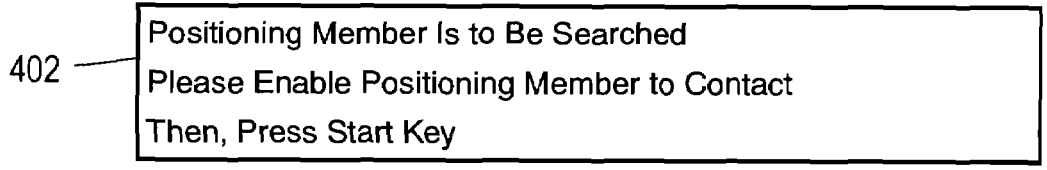
FIG. 4C shows a message displayed on the teaching device.

After causing positioning member 203 to protrude in accordance with the message shown in FIG. 4C, the operator presses keyboard 403 to instruct control device 102 to detect positioning member 203 (Step 305). At joint 1202, arm 201 rotates relatively to arm 201 in a direction directing contact point 204 toward positioning member 203. Upon detecting contact point 204 of arm 201 contacts positioning member 203, controller 102 stops the rotation of arm 201.

A method by which controller 102 detects that contact point 204 is in contact with positioning member 203 will be described below. Contact point 204 contacts positioning member 203, thereby stopping the rotation of arm 201. Motor 1202A for rotating arm 201 at axis 201A of joint 1202 is loaded with an extra torque greater than that for rotating arm 201. This causes motor 1202A to have a current flowing therein larger than that usually required for rotating arm 201. CPU 103 detects, via driver 107, the current flowing in motor 1202A. When the detected current changes from a level smaller than a predetermined current to a level larger than the predetermined current, CPU 103 acknowledges that contact point 204 is in contact with positioning member 203. Then, CPU 103 immediately stops the rotation at joint 1202, and stores the angle at this moment in RAM 106 as the origin. In FIG. 2, contact point 204 of arm 201 contacts positioning member 203.

Figure 4D:
FIG. 4D shows a message displayed on the teaching device.
Figure 4E:
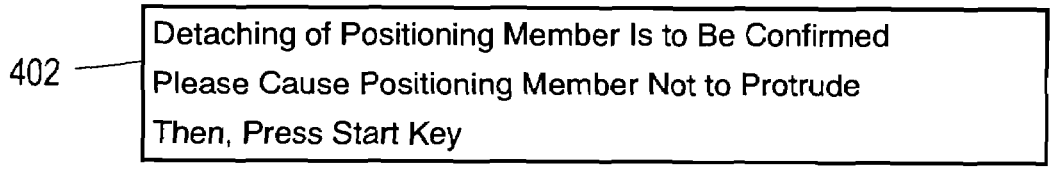
FIG. 4E shows a message displayed on the teaching device.

After controller 102 stops the rotation at joint 1202, display 402 displays a message shown in FIG. 4D for requesting the operator to execute an operation for restoring arm 201 to the stand-by position (Step 306).

Then, the operator activates keyboard 403 to allow only joint 1202 selected at Step 301 to start moving and return to the stand-by position determined at Step 303 (Step 307).

After arm 201 returns to the stand-by position, display 402 displays a message for requesting the operator to prevent positioning member 203 from contacting contact point 204 (Step 308). That is, display 402 displays a message shown in FIG. 4E for having the operator cause positioning member 203 not to contact point 204. Upon acknowledging the message, the operator puts positioning member 203 in hole 202a in arm 202 as to have positioning member 203 not to protrude from arm 202. If the robot includes positioning member 722 shown in FIG. 7, positioning member 722 is detached from mounting port 723. Then, it is confirmed that positioning member 203 cannot contact arm 201 (Step 309).

An operation of confirming that positioning member 203 cannot contact arm 201 will be described below. When contact point 204 reaches and contacts positioning member 203 due to the rotation of arm 201, motor 1202A receives a torque larger than a torque for rotating arm 201, and then, has a current flowing therein larger than a current for rotating arm 201. If contact point 204 does not contact positioning member 203, motor 1202A has a current flowing therein for rotating arm 201, and not a current flowing therein larger than the current. Therefore, when CPU 103 confirms that motor 1202A has a current flowing not larger than a predetermined current, controller 102 judges that positioning member 203 does not contact arm 201. When detecting the current flowing in motor 1202A exceeds the predetermined current, controller 102 judges that positioning member 203 contacts arm 201.

When judging that positioning member 203 cannot contact arm 201, controller 102 (CPU 103) may display this status on display 402. When judging that positioning member 203 contacts arm 201, controller 102 may display this status on display 402. Upon acknowledging this status, the operator confirms, at Steps 307 and 308, that the status of positioning member 203 is such that positioning member 203 does not contact arm 201.

At Step 309, regarding a movable range of arm 201 needed for confirming whether positioning member 203 contacts arm 201 or not, angle A1 may range from 80° to 100° if the origin is the position of positioning member 203 corresponding to angle A1 of 90°. The value 100° of angle A1 is stored in ROM 105 or RAM 106.

According to this embodiment, manipulator 101 automatically adjusts the origin sequentially in accordance with the program stored in ROM 105 and the instruction sent through teaching device 108, thereby reducing a work loaded on the operator, and reducing an operation time.

The messages shown in FIGS. 4A to 4E are displayed according to processes of adjusting the origin. This operation causes the operator to be aware of causing positioning member 203 not to protrude, that is, of disabling positioning member 203 to contact arm 201, thereby preventing damage to positioning member 203 and arm 201.

According to this embodiment, the joint to be adjusted is selected, and the selected joint is activated for adjusting the origin. However, plural joints may be selected. When confirming that positioning member 203 cannot contact the arm after the adjusting of the origin is completed, if positioning member 203 contacts the arm at least one of the selected joints, display 402 may display this situation.

If a space where manipulator 101 is installed restricts movable ranges of arms 201 and 202, it may be difficult to adjust all of respective origins at the joints are adjusted. In this case, the origins at the joints may be adjusted within available moving ranges. The origins of the joints may be adjusted one by one. Only joints requiring the adjustment of their origin may be adjusted.

INDUSTRIAL APPLICABILITY

A method of adjusting an origin for an industrial robot according to the present invention prevents an arm and a positioning member of the robot from damage. This method is effective for reducing a work loaded on an operator and reducing a time for the adjustment.

The invention claimed is:
1. A method of adjusting an origin of an industrial robot, said method comprising:
 providing an industrial robot which includes
  a first member having an accommodation hole,
  a positioning member attached to the first member and being positionable in the accommodation hole,
  a second member being rotatable relative to the first member, the second member having a contact point being operable to contact the positioning member,
  a first joint for coupling the first member with the second member;
  wherein said positioning member has a first position in which said positioning member protrudes from said first member such that the positioning member is operable to contact the contact point, and a second position in which said positioning member is disposed in the accommodation hole and is not operable to contact the contact point;
 displaying a first indication to place the positioning member in the first position;
 after said displaying the first indication, placing the positioning member in the first position;

after said placing the positioning member in the first position, rotating the second member at the first joint relative to the first member while the positioning member is in the first position;

during said rotating the second member, detecting whether or not the contact point of the second member is in contact with the positioning member;

storing a position of the second member as the origin when the contact point of the second member is in contact with the positioning member;

after said storing the position of the second member, positioning the contact point at a predetermined position where the contact point does not contact the positioning member;

displaying a second indication to place the positioning member in the second position;

after said displaying said second indication, placing the positioning member in the second position.

2. The method of claim 1, further comprising:
confirming whether or not the positioning member cannot contact the contact point.

3. The method of claim 2, wherein said confirming whether or not the positioning member cannot contact the contact point comprises rotating the second member at the first joint relative to the first member.

4. The method of claim 1,
wherein said displaying the second indication to place the positioning member in the second position is executed before said positioning the contact point of the second member at the predetermined position.

5. The method of claim 1, wherein the industrial robot further includes a second joint, said method further comprising
selecting the first joint from the first joint and the second joint.

6. The method of claim 1, wherein the first joint of the industrial robot further includes a motor for rotating the second member relative to the first member, and
wherein said detecting whether or not the contact point of the second member is in contact with the positioning member comprises detecting a current flowing in the motor.

7. The method of claim 1, wherein in said second position said positioning member is disposed entirely within said accommodation hole.

8. The method of claim 7, wherein said accommodation hole is configured such that when said positioning member is in said second position, said positioning member does not contact said contact point regardless of a position of said second member.

9. The method of claim 7, wherein said positioning member is partially disposed in said accommodation hole when said positioning member is in said first position such that a first portion of said positioning member is disposed in said accommodation hole and a second portion of said positioning member protrudes from said accommodation hole.

10. The method of claim 7, wherein said first member has a surface facing said second member, and
wherein said accommodation hole is provided in said surface of said first member.

11. The method of claim 7, wherein said second member is rotatable such that said second member covers said accommodation hole when said positioning member is in said second position.

12. The method of claim 1, wherein said placing the positioning member in the second position comprises disposing said positioning member entirely within said accommodation hole.

13. The method of claim 1, wherein said accommodation hole is configured such that when said positioning member is in said second position, said positioning member does not contact said contact point regardless of a position of said second member.

14. The method of claim 1, wherein said positioning member is partially disposed in said accommodation hole when said positioning member is in said first position such that a first portion of said positioning member is disposed in said accommodation hole and a second portion of said positioning member protrudes from said accommodation hole.

15. The method of claim 1, wherein said first member has a surface facing said second member, and
wherein said accommodation hole is provided in said surface of said first member.

16. The method of claim 1, wherein said second member is rotatable such that said second member covers said accommodation hole when said positioning member is in said second position.

17. A method of adjusting an origin of an industrial robot, said method comprising:
providing an industrial robot which includes
a first member having an accommodation hole,
a positioning member attached to the first member and being positionable in the accommodation hole,
a second member being rotatable relative to the first member, the second member having a contact point being operable to contact the positioning member,
a first joint for coupling the first member to the second member,
wherein said positioning member has a first position in which said positioning member protrudes from said first member such that the positioning member is operable to contact the contact point, and a second position in which said positioning member is disposed in the accommodation hole and is not operable to contact the contact point;

displaying a first indication to place the positioning member in the first position;

rotating the second member at the first joint relative to the first member while the positioning member is in the first position;

detecting whether or not the contact point of the second member is in contact with the positioning member; and storing a position of the second member as the origin when the contact point of the second member is in contact with the positioning member.

18. The method of claim 17, further comprising:
after said storing the position of the second member as the origin, positioning the contact point of the second member at a predetermined position where the contact point does not contact the first member;

displaying an second indication to place the positioning member in the second position; and confirming whether or not the positioning member cannot contact the contact point.

19. The method of claim 18, wherein said confirming whether or not the positioning member cannot contact the contact point comprises rotating the second member at the first joint relative to the first member.

20. The method of claim 17, further comprising:
displaying an second indication to place the positioning member in the second position; and positioning the contact point of the second member at a predetermined position by rotating the second member relative to the first member while the positioning member is in the second position, wherein said displaying the second indication to place the positioning member in the second position is executed before said positioning the contact point of the second member at the predetermined position.

21. The method of claim 17, wherein the industrial robot further includes a second joint, said method further comprising selecting the first joint from the first joint and the second joint.

22. The method of claim 17, wherein the first joint of the industrial robot further includes a motor for rotating the second member relative to the first member, and wherein said detecting whether or not the contact point of the second member is in contact with the positioning member comprises detecting a current flowing in the motor.

23. The method of claim 17, wherein said first member comprises an accommodation hole, and wherein in said second position said positioning member is disposed entirely within said accommodation hole.

* * * * *